UNITED STATES PATENT OFFICE.

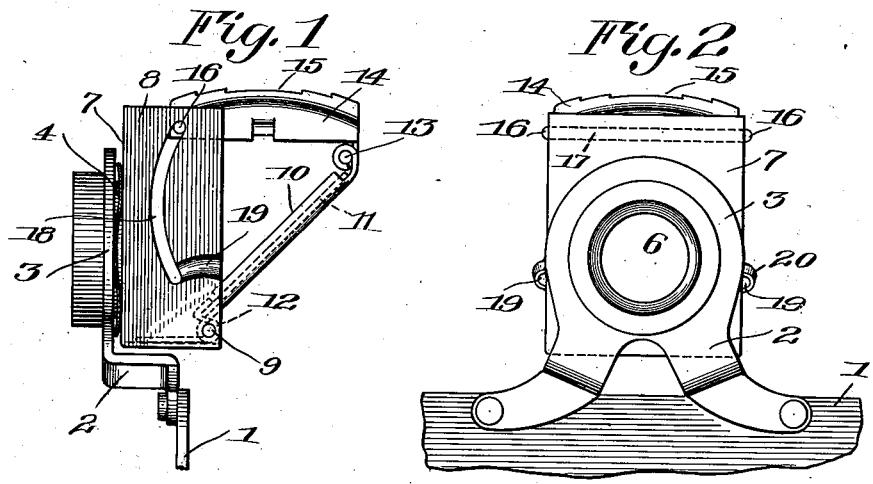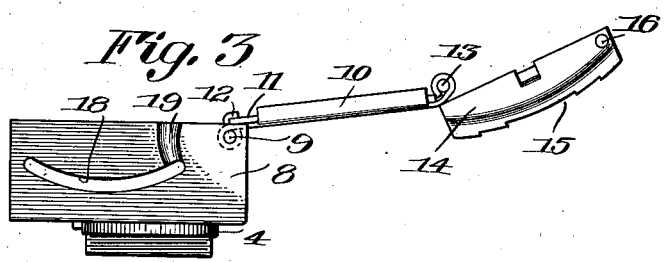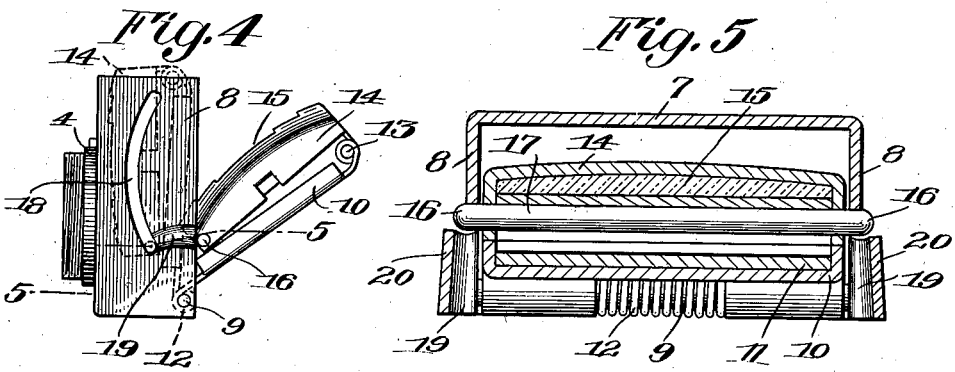

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

VIEW-FINDER.

1,144,074.   Specification of Letters Patent.   Patented June 22, 1915.

Application filed March 23, 1914. Serial No. 826,789.

*To all whom it may concern:*

Be it known that I, CHARLES F. SPEIDEL, of Rochester, in the county of Monroe and State of New York, have invented certain new and useful Improvements in View-Finders; and I do hereby declare the following to be a full, clear, and exact description of the same, reference being had to the accompanying drawings, forming a part of this specification, and to the reference-numerals marked thereon.

My present invention relates to view finders and more particularly to collapsible finders of the type disclosed in the prior United States Letters Patent to A. A. Ruttan et al., No. 1,066,848, dated July 8, 1913, and it has for its object to effect an improvement of the finder there shown whereby the parts may be readily separated and made accessible for various purposes but more particularly for the purpose of cleaning the reflecting surfaces.

To these and other ends the invention consists in certain improvements and combinations of parts, all as will be hereinafter more fully described, the novel features being pointed out in the claims at the end of the specification.

In the drawings: Figure 1 is a side elevation of a view finder constructed in accordance with and illustrating one embodiment of my invention; Fig. 2 is a front elevation thereof, both 1 and 2 showing the device in operative position; Fig. 3 is a side elevation of the device in its extended or cleaning position; Fig. 4 is a side elevation showing in full lines the device in partly folded position, illustrating the process of detaching the parts and in dotted lines in folded position, and Fig. 5 is an enlarged sectional view taken substantially on the line 5—5 of Fig. 4 with reference to the dotted line position of the parts.

Similar reference numerals throughout the several figures indicate the same parts.

The particular finder constituting the present embodiment of the invention is designed for use on an ordinary hand camera wherein exposures are made at times with the camera in normal position and at other times with it held on its side in order to dispose the greater dimension of the field of exposure in conformity with the greater dimension of the object, in either of which
cases the finder must be righted to a corre-
sponding position. These functions are featured in the prior patent referred to so need not be explained in detail here, particularly as the present improvements relate more particularly to the collapsing nature of the finder.

As illustrative of one of the positions in which the finder is often desired to be mounted on the camera and in which its collapsing is advantageous or required, there is shown at 1 a fragment of the upright front or lens board of a camera to which is secured a finder bracket 2. This bracket has an annular portion 3 that constitutes the sole support for the finder proper by providing a journal in which rotates the front lens tube 4 having a securing cap or ring 5 at the front of the bracket. The finder may thus be shifted through an angle of 90° on the axis of its front lens 6 carried in the tube 4. This is the main or field lens.

The tube and lens just described is fixed to a front lens plate 7 having rearwardly turned lateral flanges 8. A small shaft or pin 9 extends across between the lower portions of the flanges on which pin is pivoted at its lower end an angle mirror frame 10 carrying an angle mirror 11. A spring 12 normally tends to rotate this frame and mirror rearwardly to the operative position of Fig. 1, but the frame may swing forwardly against the tension of the spring to a position against or parallel with the front lens support 7. At its upper or rear end, the angle mirror frame 10 is hinged at 13 to the rear end of a frame 14 that carries the top or reflecting lens 15. It is in this lens that the image is viewed, the latter being cast upon the angle mirror 11 by the front or field lens 6 and thence reflected in the lens 15 in the usual manner from which it is obvious that ground glass or a similar element may be used at 15. At its forward end, the top frame 14 has laterally extending projections 16 preferably formed by the rounded ends of a pin 17 that spans the frame. These projections coöperate with arcuate slots 18 in the flanges 8 forming guides in which they travel. The spring 12 in actuating the angle mirror frame 10 rearwardly also through the medium of the latter, tends to hold the top lens frame 14 in its horizontal or operative position with the projections 16 at the tops of the slots 18, as will be understood. By pressing forwardly on the rear or hinged ends or the frames 10 and 14 (as when they meet an obstruction upon being folded within the camera) the projections 16 are caused to travel downwardly the length of the slot and the top mirror frame 14 is folded against the front lens support 7 and between it and the angle mirror frame 10 which swings forwardly into substantial parallelism with the other parts. Releasing the pressure allows the parts to return automatically to their former operative positions. It is, however, desirable in certain instances to separate or partially separate the three parts whereby they may be rendered more accessible as for cleaning purposes. In the practice of my present invention, therefore, I provide means whereby the chain of pivotal connection between the front lens support, angle mirror frame and top lens support may be temporarily disestablished. Preferably, the top lens support 14 is separated from the front lens support 7 so that the members may be extended in a line as in Fig. 3 and all surfaces thereof made accessible at once. To this end, in the present instance, I form in the side flanges 8 transverse channels 19 communicating with the arcuate slots 18 and leading therefrom to the rear edges of the flanges 8. These channels may be stamped out from the material of the flanges as clearly indicated in Fig. 5 and the bottom walls 20 thereof are preferably tapered or inclined to converge toward the slots with their inner extremities closer together than the length of the pin 17, as shown in the same figure so that the rounded ends of the projections 16 extend just a fractional distance beyond them. I also prefer to arrange the channels at the lowermost ends of the slots so the projections will be in register with them only when the finder is folded. Therefore, when it is desired to spread out the parts to the positions shown in Fig. 3, it is only necessary to fold the frames into parallelism and then exert slight rearward pressure on the forward (at that time, the lower) end of the top lens frame 14. As the flanges 8 are slightly resilient they give sufficiently under the cam action of the rounded ends of the projections 16 to allow the latter to enter the channels 19 whereupon, by swinging the parts rearwardly on the pin 9, the projections traverse the channels and emerge at the rear. The top mirror frame 14 may then be folded back on the hinge 13. Of course, the channels are flared slightly as shown, or made arcuate, or both, to accommodate the path of the projections 16 as defined by the pivot 9 and they as readily reenter the channels and snap back into their positions in the guide slots 18. The bottom walls 20 oppose the entrance of the projections to the channels only to a sufficient extent to prevent inadvertent movement therein when the parts are folded which extent is obviously very little as the spring 12, in thrusting the angle mirror frame 10 rearwardly acts very quickly to raise the projections in the slots 18, if they are given even the smallest chance to coöperate with the rear cam walls of the slots.

I claim as my invention:

1. In a view finder, the combination with a front lens support, of an angle mirror and a top lens support pivotally connected to each other and to the front lens support to assume relatively angular operative positions or substantially parallel folded positions, means normally tending to actuate the parts to operative positions and means for effecting disengagement of one of the last mentioned members from the front lens support only when said member is in other than the operative position.

2. In a view finder, the combination with a front lens support and an angle mirror pivoted thereto and adapted to fold to a position substantially parallel therewith, of a top lens support pivoted to one of said parts at one end and having a projection at the other and a continuous guide on the other part in which the said projection is arranged to travel whereby the top lens support is caused to assume a folded position between the other parts as the angle mirror is moved toward the front lens support, said guide being provided with a channel leading therefrom and through which the projection on the top lens support may be passed to disconnect the top lens support from the guide carrying member.

3. In a view finder, the combination with a front lens support and an angle mirror pivoted thereto and adapted to fold to a position substantially parallel therewith, of a top lens support pivoted to one of said parts at one end and having a projection at the other and a spring flange on the other part provided with a continuous guide in which the said projection is arranged to travel whereby the top lens support is caused to assume a folded position between the other parts as the angle mirror is moved toward the front lens support, said guide being provided with a channel leading therefrom and formed by a depression in the spring flange having an inclined bottom wall, through which channel the projection on the top lens support may be passed to disconnect the top lens support from the guide carrying member, by deflecting the flange slightly to admit the passage of the projection from the guide into the channel.

4. In a folding view finder, the combination with a front lens support having a rearwardly turned spring flange at one side thereof, provided with a slot constituting a guide and with a depression constituting a channel leading from the slot or guide and having an inclined bottom wall, and an angle mirror pivoted at its lower end to said front lens support, of a top lens support pivoted at its rear end to the upper end of the angle mirror and having a rounded projecting pin at its front end coöperating with the slot or guide on the front lens support whereby the top lens support is caused to assume a folded position between the other parts as the angle mirror is moved toward the front lens support, the rounded end of said pin being adapted to be forced from the guide through the channel by slightly deflecting the spring flange to disconnect the top lens support from the front lens support.

CHARLES F. SPEIDEL.

Witnesses:
HENRY L. THAYER,
JOHN A. ROBERTSON.